United States Patent [19]

Ozil et al.

[11] Patent Number: 4,682,285
[45] Date of Patent: Jul. 21, 1987

[54] UNIVERSAL COUPLING MEANS

[76] Inventors: Maurice Ozil, 73, rue des Morillons, Paris; Alain Falguieres, 44, rue Victor Hugo, Puteaux, both of France

[21] Appl. No.: 902,110

[22] Filed: Aug. 29, 1986

Related U.S. Application Data

[63] Continuation of Ser. No. 517,447, Jul. 26, 1983, abandoned.

[30] Foreign Application Priority Data

Aug. 6, 1982 [FR] France .................. 82 13765

[51] Int. Cl.[4] ........................................... G06F 13/00
[52] U.S. Cl. ............................................ 364/200
[58] Field of Search ...................... 364/200, 900

[56] References Cited

U.S. PATENT DOCUMENTS

| | | | |
|---|---|---|---|
| 3,810,105 | 5/1974 | England | 364/200 |
| 4,228,496 | 10/1980 | Katzman et al. | 364/200 |

Primary Examiner—Thomas M. Heckler
Attorney, Agent, or Firm—Oblon, Fisher, Spivak, McClelland & Maier

[57] ABSTRACT

A universal coupling unit for linking processing systems incorporating computers or processors with at least one peripheral unit. Each processing system has at least one processor and an exchange bus for exchanging information with the peripheral unit. The coupling units comprise bus controllers connected respectively to the exchange buses and to a local bus, itself connected to the peripheral unit by circuits for controlling exchanges of data and for processing control and state information. The bus controllers are able to manage the access protocols to the exchange buses, the information exchanges on the exchange buses and on the local bus, as well as any request made by a processor for access to the local bus. The control units comprise a microprocessor for managing the priorities of the access requests of the processors and the processing of controls and states contained in the information exchanged on the local bus. Selection devices are connected to the bus controllers and controlled by the management microprocessor for selecting, as a function of the priorities, the controller able to ensure a data exchange on the local bus. An input and output buffer register is connected to the local bus and to the peripheral unit for receiving the data to be transmitted to the peripheral unit for receiving the data to be transmitted to the peripheral unit or for receiving the data to be transmitted to one of the processors.

3 Claims, 1 Drawing Figure

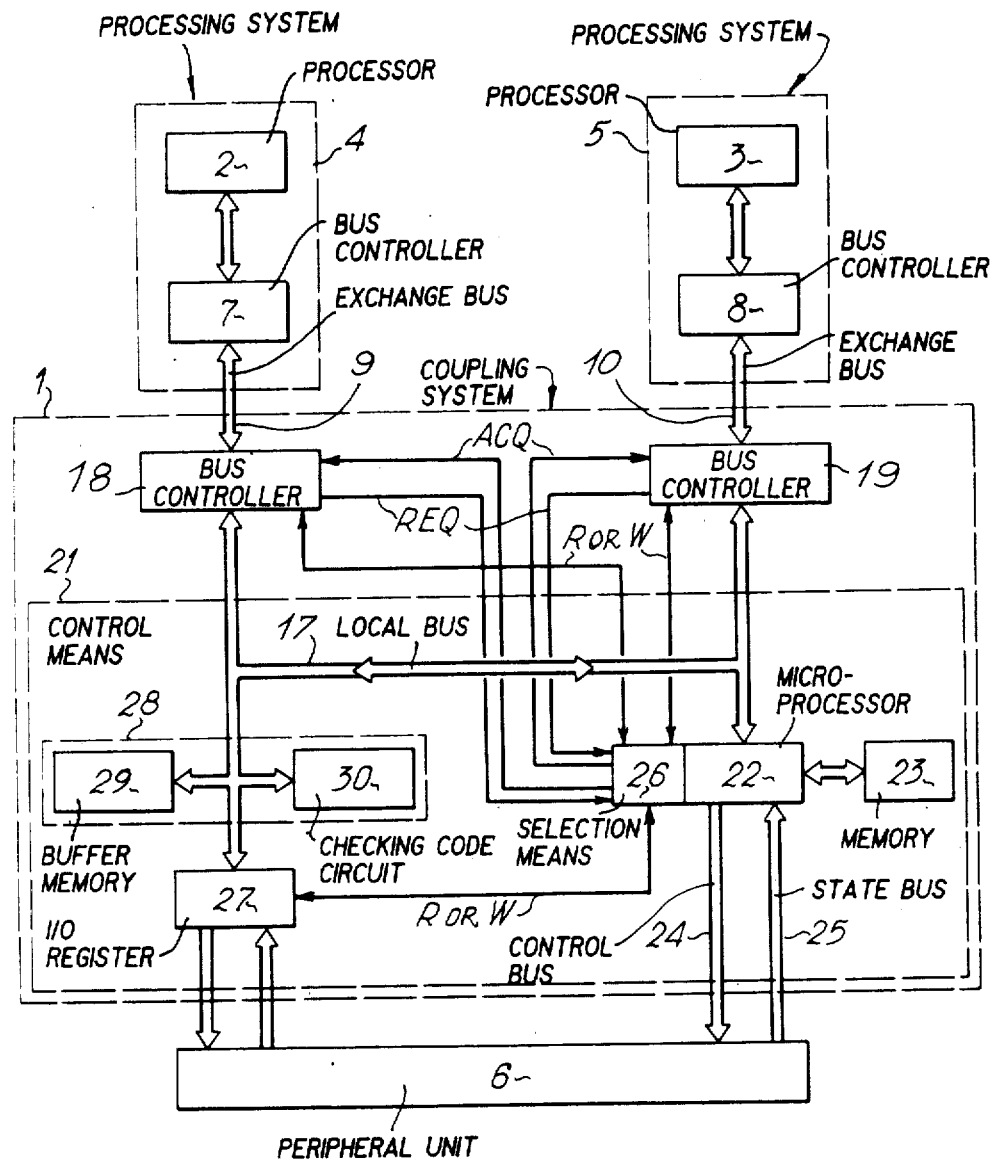

UNIVERSAL COUPLING MEANS

This application is a continuation of application Ser. No. 517,447, filed July 26, 1983, abandoned.

BACKGROUND OF THE INVENTION

The present invention relates to a universal coupling means for linking processing systems incorporating at least computers or processors, with at least one peripheral unit. It applies more particularly to multicomputer systems in which it is necessary to exchange information between the memories of several processing systems and one or more peripheral units, such as e.g. magnetic tape or disks readers.

In general terms, a processing system is a logic processing unit, which can have one or more processors or computers, optionally realized with the aid of microprocessors and input-output units and optionally peripheral units.

Coupling means are known making it possible to manage information exchanges between several processing systems and at least one peripheral unit. In general, these coupling means are designed as a function of each type of peripheral unit to be linked with several processing systems. Thus, the connection of another type of peripheral unit makes it necessary for the user to have a new coupling device adapted to the new peripheral unit chosen. This impossibility of rendering commonplace the connection of random peripheral unit types in a multicomputer system leads to very long connection delays, high costs for each coupling of a new peripheral unit, a number of different coupling devices for the same multicomputer system and difficult choices with respect to the peripheral unit.

SUMMARY OF THE INVENTION

The object of the present invention is to obviate these disadvantages and more particularly to provide a coupling means between several processing systems, e.g. computers, and at least one peripheral unit making it possible in simple manner, to connect a random type of peripheral unit to several processors or computers, even if said unit and said processors have operating specifications that make compatible operations difficult. This coupling means, apart from the fact that it permits and simplifies the connection of any random peripheral unit to processing systems, also makes it possible to easily manage conflicts regarding access requests of the processing systems to each peripheral unit. Moreover, the invention also aims at increasing the access availability between the processing systems and a peripheral unit by offering an access by two basically separate buses.

The invention relates to a universal coupling means for linking information processing systems and at least one peripheral unit, each processing system comprising at least one processor and an exchange bus for exchanging information with the peripheral unit. The means comprise bus controllers connected respectively to the exchange buses and to a local bus, itself connected to the peripheral unit by means for controlling exchanges of data and for processing control and state information, the bus controllers being able to manage the access protocols to the exchange buses, the information exchanges on the exchange buses and on the local bus, as well as any request made by a processor for access to the local bus.

According to another feature of the invention, the control means comprise a microprocessor for managing the priorities of the access requests of the processors and the processing of controls and states contained in the information exchanged on the local bus, selection means connected to the bus controllers and controlled by the management microprocessor for selecting, as a function of the priorities, the controller able to ensure a data exchange on the local bus, and an input and output buffer register connected to the local bus and to the peripheral unit for receiving the data to be transmitted to the peripheral unit or for receiving the data to be transmitted to one of the processors.

According to another feature, the selection means comprise a data code control circuit connecting the local bus to the input and output buffer register.

Finally, according to another feature, the control circuit comprises a buffer store connected to the local bus and to the input and output buffer register, and a device connected to said store for controlling a cyclic data code.

DESCRIPTION OF THE DRAWING AND PREFERRED EMBODIMENTS

The invention is described in greater detail hereinafter relative to non-limitative embodiments and the attached drawing showing diagrammatically the coupling system according to the invention.

The coupling system 1 diagrammatically shown in the drawing makes it possible to link processing systems 4 and 5, with at least one peripheral unit 6, such as e.g. a magnetic tape device or a disk. The processors 2, 3 of these processing systems are respectively connected to bus controllers 7,8 permitting the exchange of information between the processing systems and the peripheral unit 6. These information exchanges take place across exchange buses 9, 10, each of these buses being associated with the processors. In per se known manner said information contains data, controls and states, expressed in binary form. The controls or commands are instructions given to the processing systems or to the peripheral unit for the performance of an action. The states make it possible to express in binary form, the situations in which the peripheral unit is before, during or after performing an action. The exchange buses 9, 10 diagrammatically shown in the drawing, are well known in the art and can e.g. be buses as defined by IEEE standard 488. In the considered embodiment, the number of peripheral units has been limited to one and the number of exchange buses 9, 10 to 2. However, it is obvious that these numbers can differ. For example, peripheral unit 6 could be replaced by a row of peripheral units, connected in series or in parallel.

The coupling system 1 has, for each exchange bus 9, 10, a bus controller. These bus controllers 18, 19 are connected to a local bus 17 and ensure the management of the access protocols to the corresponding specific buses 9, 10. These bus controllers are known and can e.g. be controllers of type TMS 9914 defined in IEEE standard 488. As already known, the protocols are conventions defining the performance of information exchanges between specific buses 9, 10 and bus controllers 18, 19.

The means also comprises control means 21 incorporating a microprocessor 22, associated with a memory 23. This microprocessor manages the priorities of access requests from processors 2, 3 and processing systems 4, 5, while also making it possible to process commands and states contained in the information exchanged on local bus 17 and which are supplied or received by the management microprocessor 22 on a command bus 24 and on a state bus 25. The command or control means also comprise selection means 26 connected to bus controllers 18, 19 and controlled by management processor 22 in order to select, as a function of the priorities, whichever of these controllers can ensure a data exchange at a given time.

The control means also comprise an input and output register 27 connected to local bus 17 and to peripheral unit 6, for receiving the data to be transmitted to this peripheral unit, or for receiving the data to be transmitted to one of the processors 2, 3. Control means 21 also comprise a control circuit 30 checking the code of the data exchanged on local bus 17 and connecting said bus to input and output register 27. This control circuit can be constituted as known by a buffer memory 29 connected to local bus 17 and to register 27, as well as a device 30 connected to buffer store 29, in order to control the cyclic code of the data exchanged on bus 17.

For each exchange bus controller, the selection means 26 constituted by logic gates of the NAND type comprise a writing or reading control circuit, associated with the management microprocessor, in order to control, via the corresponding controller, the reading or writing of information on exchange buses 9, 10.

The selection means 26 also comprise a reading or writing control circuit, connected to management microprocessor 22 and to input and output register 27, for controlling the reading of data supplied by peripheral unit 6 and contained in register 27, or for controlling the writing into this register of data from local bus 17 and which are supplied by one of the processing systems 2, 3. Selection means 26 are well known in the art and do not have to be described in detail here.

The system described hereinbefore functions in the following way. For example, if the processing system 4 wishes to have access to the peripheral unit 6, it supplies a data block, called the command or control block, to the management microprocessor 22. As a function of the availability of peripheral unit 6, compared with that of requests other than that of e.g. processing system 5, management microprocessor 22 replies by issuing a data block, called acknowledgement of receipt and controls and positions the controls necessary for peripheral unit 6 on control bus 24 with, if necessary, the control of the states of the peripheral unit on state bus 25. Then when e.g. processing system 4 wishes to write data into peripheral unit 6, it supplies its data block on bus 9 for buffer store 29. Under the control of microprocessor 22 (Intel 87C48), control device 30 (comprising a parallel-series conversion circuit 74 Ls 299 and a checking circuit such as a ML 9401 both by Texas Instruments), checks the absence of errors in the data block, which is then transmitted from the buffer store 29 to peripheral unit 6 by input and output register 27. After reading state bus 25, microprocessor 22 supplies to processing system 4, a data block, called performance report, indicating whether the overall transfer of data has been correctly performed up to peripheral unit 6.

Hereinbefore, the elementary exchange of information has taken place in the following way. When e.g. processing system 4 wishes to supply elementary data to coupling system 1, bus controller 18 supplies a request REQ by selection means 26. The later supplies a request acceptance signal ACQ and transfers the elementary data, into buffer store 29 by means of local bus 17, by supplying a reading control signal R to bus controller 18.

In the same way, selection means 26 also supplies the input or output register 27 with a data writing control signal W. The data are transferred into this register, after being recorded in buffer store 29, in such a way that device 30 controls the cyclic code of said data. The other information, such as commands or states, which are transmitted by the specific bus 9 and which come from processing system 4, transit on local bus 17. They are processed by the management microprocessor 22 for supply to peripheral unit 6. The same operations are performed if peripheral unit 6 issues a request for obtaining access to processing system 4, or to processing system 5.

It is obvious that in the system described hereinbefore, the means used could have been replaced by equivalent means, without passing beyond the scope of the invention.

What is claimed is:

1. A universal coupling means for linking information and data processing systems and at least one peripheral unit, each processing system comprising at least one processor and an exchange bus for exchanging information and data with the peripheral unit under the management of said coupling means which is connected to the exchange buses of the processing systems and to the peripheral unit, said coupling means comprising bus controllers connected respectively to the exchange buses and to local buses, control means connected to the local buses and to the peripheral units;

the bus controllers managing the information exchanges on the exchange buses and on the local buses, as well as any request made by a processor requiring an access to the peripheral unit through the corresponding local bus, the control means comprising a microprocessor for managing priorities of the access requests made by the processors and for processing control information provided by data processing systems and information provided by the peripheral unit in relating to the state of this unit, the information being exchanged on the local bus, selection means connected to the bus controllers and controlled by the microprocessor of the control means for selecting, as a function of the priorities, the controller ensuring a data exchange on a local bus, and an input and output buffer register connected to the local buses and to the peripheral unit for receiving the data to be transmitted to the peripheral unit from one of the processors or for receiving the data to be transmitted to one of the processors from the peripheral unit.

2. A coupling means according to claim 1, wherein the control means further comprises a data code control circuit, connecting the local buses to the input and output buffer register.

3. A coupling means according to claim 2, wherein the control means comprises a buffer memory connected to the local buses and to the input and output buffer register as well as a device connected to said memory for controlling cyclic data code.

* * * * *